US011815692B1

(12) United States Patent
Pickett et al.

(10) Patent No.: US 11,815,692 B1
(45) Date of Patent: Nov. 14, 2023

(54) APPARATUS, SYSTEM, AND METHOD FOR BLOCKING LIGHT FROM EYECUPS

(71) Applicant: META PLATFORMS TECHNOLOGIES, LLC, Menlo Park, CA (US)

(72) Inventors: David Michael Pickett, Seattle, WA (US); Joseph Patrick Sullivan, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/074,572

(22) Filed: Oct. 19, 2020

Related U.S. Application Data

(60) Provisional application No. 63/004,446, filed on Apr. 2, 2020.

(51) Int. Cl.
*G02B 27/01* (2006.01)

(52) U.S. Cl.
CPC .. *G02B 27/0176* (2013.01); *G02B 2027/0154* (2013.01); *G02B 2027/0178* (2013.01)

(58) Field of Classification Search
CPC ............... G02B 27/0176; G02B 2027/0178
See application file for complete search history.

(56) References Cited

U.S. PATENT DOCUMENTS

| 1,916,628 | A | * | 7/1933 | Meyrowitz | A61F 9/02 2/443 |
|---|---|---|---|---|---|
| 2,526,737 | A | * | 10/1950 | Farina | A61F 9/028 128/201.15 |
| 2008/0257362 | A1 | * | 10/2008 | Davison | G02C 5/001 128/858 |
| 2015/0253574 | A1 | * | 9/2015 | Thurber | G02B 27/0172 359/630 |
| 2016/0210782 | A1 | * | 7/2016 | Thomas | G02B 27/017 |
| 2017/0124699 | A1 | * | 5/2017 | Lane | G06V 40/19 |
| 2018/0180893 | A1 | * | 6/2018 | Gupta | G02B 27/0176 |
| 2019/0056590 | A1 | * | 2/2019 | Chuang | G02B 27/0176 |
| 2020/0093361 | A1 | * | 3/2020 | Jackson | A61B 3/0075 |
| 2020/0103642 | A1 | * | 4/2020 | Hirowatari | G02B 27/0176 |
| 2022/0035171 | A1 | * | 2/2022 | Yamamoto | G09G 5/00 |

* cited by examiner

*Primary Examiner* — William Boddie
*Assistant Examiner* — Bipin Gyawali
(74) *Attorney, Agent, or Firm* — Greenberg Traurig, LLP

(57) ABSTRACT

A light-blocker apparatus may include a support element dimensioned to fit a contour of an eyecup of a head-mounted display. Additionally, the light-blocker apparatus may include an attachment feature, defined at a base of the support element, that connects the support element to the eyecup such that, when the support element is attached to the eyecup, the support element moves in conjunction with the eyecup. The light-blocker apparatus may also include an interface extending from the support element and may be dimensioned to interface with an eye area of a user's face to reduce light entering the eyecup from outside of the head-mounted display when worn by a user. Various other apparatuses, systems, and methods are also disclosed.

20 Claims, 14 Drawing Sheets

Method 1200

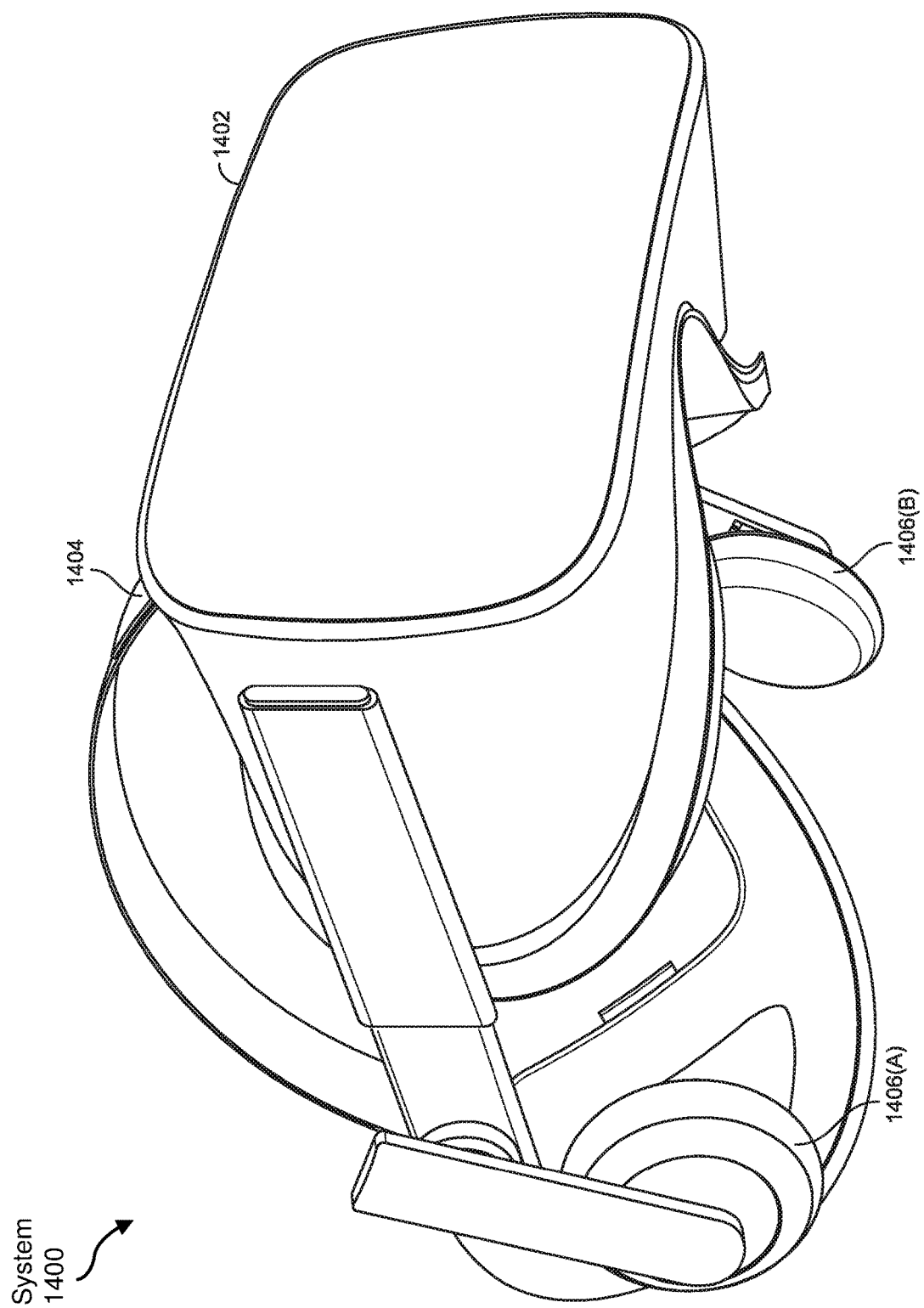

APPARATUS, SYSTEM, AND METHOD FOR BLOCKING LIGHT FROM EYECUPS

CROSS REFERENCE TO RELATED APPLICATION

This application claims the benefit of U.S. Provisional Application No. 63/004,446, filed 2 Apr. 2020, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 14 is an illustration of an exemplary virtual-reality headset that may be used in connection with embodiments of this disclosure.

Figure 1A:
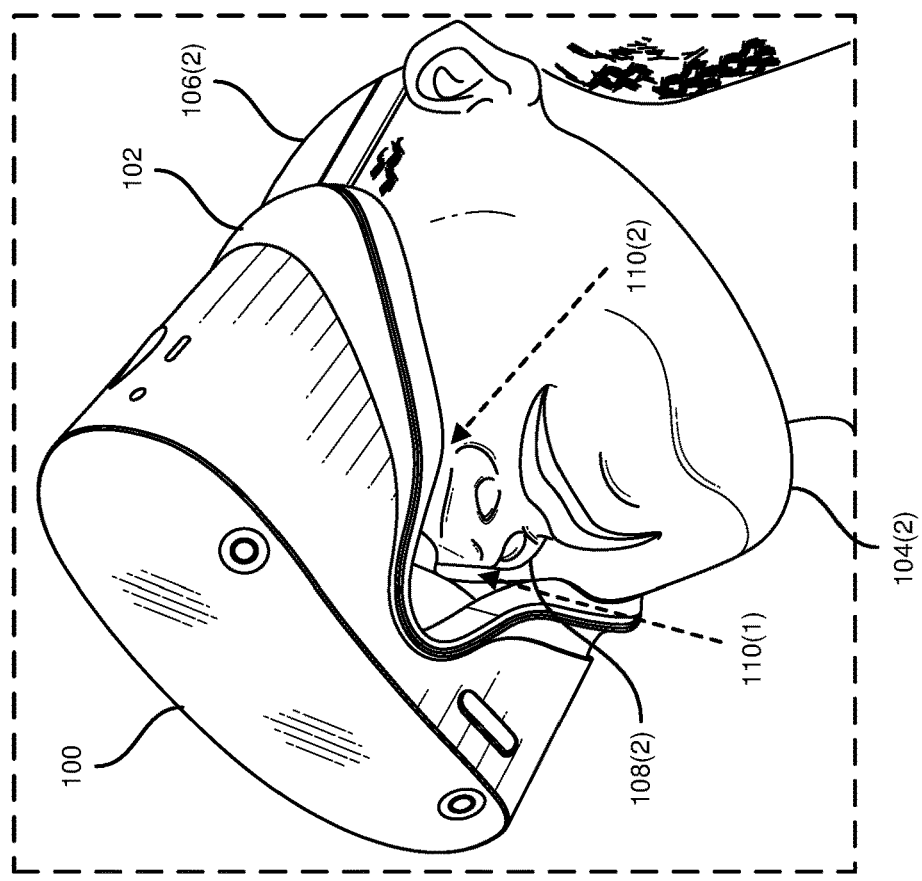
FIGS. 1A and 1B are perspective views of an exemplary head-mounted display worn by two exemplary users.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure describes and illustrates various apparatuses, systems, and methods for blocking light from eyecups. As will be explained in greater detail below, embodiments of the present disclosure may, by attaching a light-blocker apparatus to an eyecup, interface with a user's face around an eye area to block out light that may leak into the eyecup. For example, the light-blocker apparatus may block light that may leak into a head-mounted display, such as a virtual-reality headset, due to different nose sizes and shapes that cause gaps between the display and the nose. This may reduce disruptions to a user's viewing experience while the user wears the head-mounted display. By interfacing with a user's face around the eyes, rather than attempting to adjust to different face and nose shapes, the light-blocker apparatus may more easily adjust to an area with less variation between users. The light-blocker apparatus may include a flexible material for the interface portion, which may bend to create an improved fit near a user's eyes. The light-blocker apparatus may also include a rigid base to hold a general molded shape and attach to the eyecup. Additionally, attachment features may be included on the rigid base such that the light-blocker apparatus may be attached or removed as needed. When attached, the light-blocker apparatus may then move along with the eyecup, such as when eyecups are adjusted to different interpupillary distances for different users. Furthermore, prescription lenses may be integrated with light-blocker apparatuses to simultaneously improve visual acuity and reduce light leakage.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

Figure 1B:
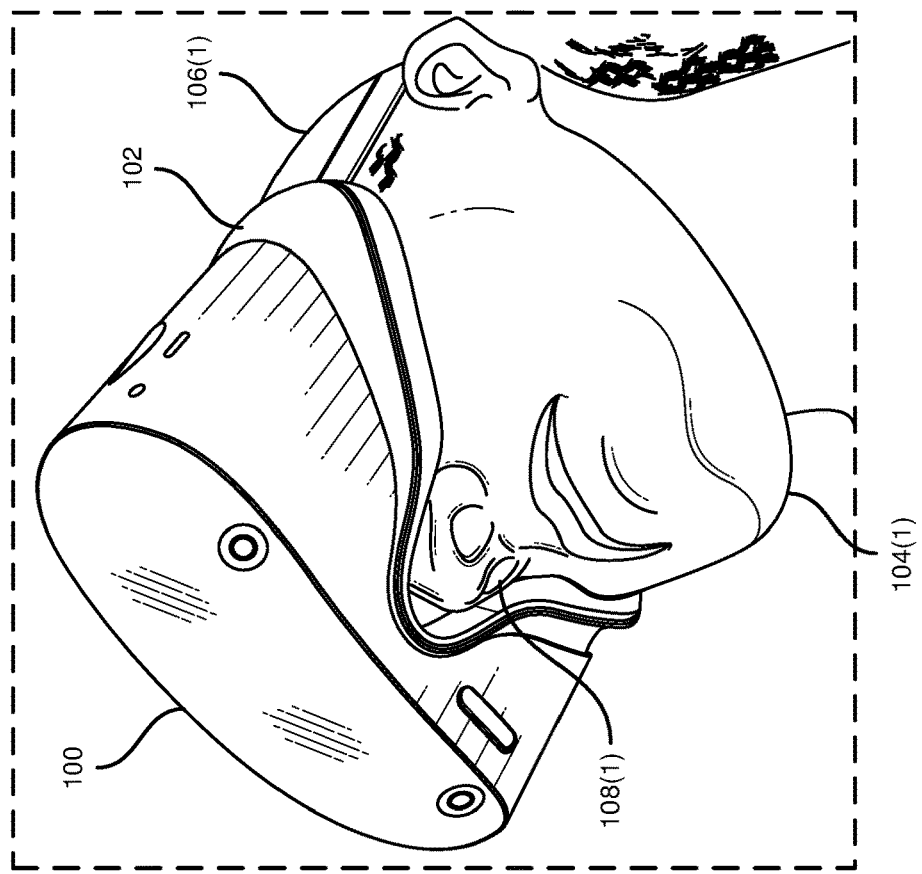

The following will provide, with reference to FIGS. 1A and 1B, detailed descriptions of fitting problems that may arise for head-mounted displays. Detailed descriptions of an exemplary light-blocker apparatus that blocks light from eyecups on an exemplary head-mounted display will be provided in connection with FIGS. 2-5. In addition, detailed descriptions of an alternate exemplary light-blocker apparatus fitted to an alternate exemplary head-mounted display will be provided in connection with FIGS. 6-9. Furthermore, detailed descriptions of adjustments of exemplary eyecups and exemplary light-blocker apparatuses to eye positions will be provided in connection with FIGS. 10A-10B and 11A-11B. Detailed descriptions of an exemplary method for manufacturing light-blocker apparatuses will be described in connection with FIG. 12. Finally, detailed descriptions of exemplary augmented-reality and virtual-reality systems that may incorporate light-blocker apparatuses will be described in connection with FIGS. 13-14.

FIGS. 1A and 1B illustrate perspective views of an exemplary head-mounted display 100 worn by exemplary users 104(1) and 104(2). In some examples, head-mounted display 100 may include a wearable frame 102 securable to user's head 106(1) and/or user's head 106(2). As illustrated in FIG. 1B, user 104(2) may have a flatter and/or wider nose 108(2) than a nose 108(1) of user 104(1). Due to the shape of nose 108(2), user 104(2) may experience leakage of light 110(1) and 110(2) from around nose 108(2) into head-mounted display 100.

In the examples of FIGS. 1A and 1B, head-mounted display 100 may include a visual display viewable when worn by users 104(1) and 104(2). For example, head-mounted display 100 may include augmented-reality system 1300 of FIG. 13 and/or virtual-reality system 1400 of FIG. 14 and may include a visual display such as a liquid crystal display (LCD), a light emitting diode (LED) display, an organic LED (OLED) display, a digital light project (DLP) micro-display, a liquid crystal on silicon (LCoS) micro-display, and/or any other suitable type of display screen. When worn by user 104(1) or user 104(2), the visual display may be viewed through eyecups or may be embedded as lenses in eyecups. Additionally, the visual display may represent a single display visible to both eyes simultaneously or may represent a separate display screen for each eye, such as a separate image transmitted through each eyecup.

Figure 2:
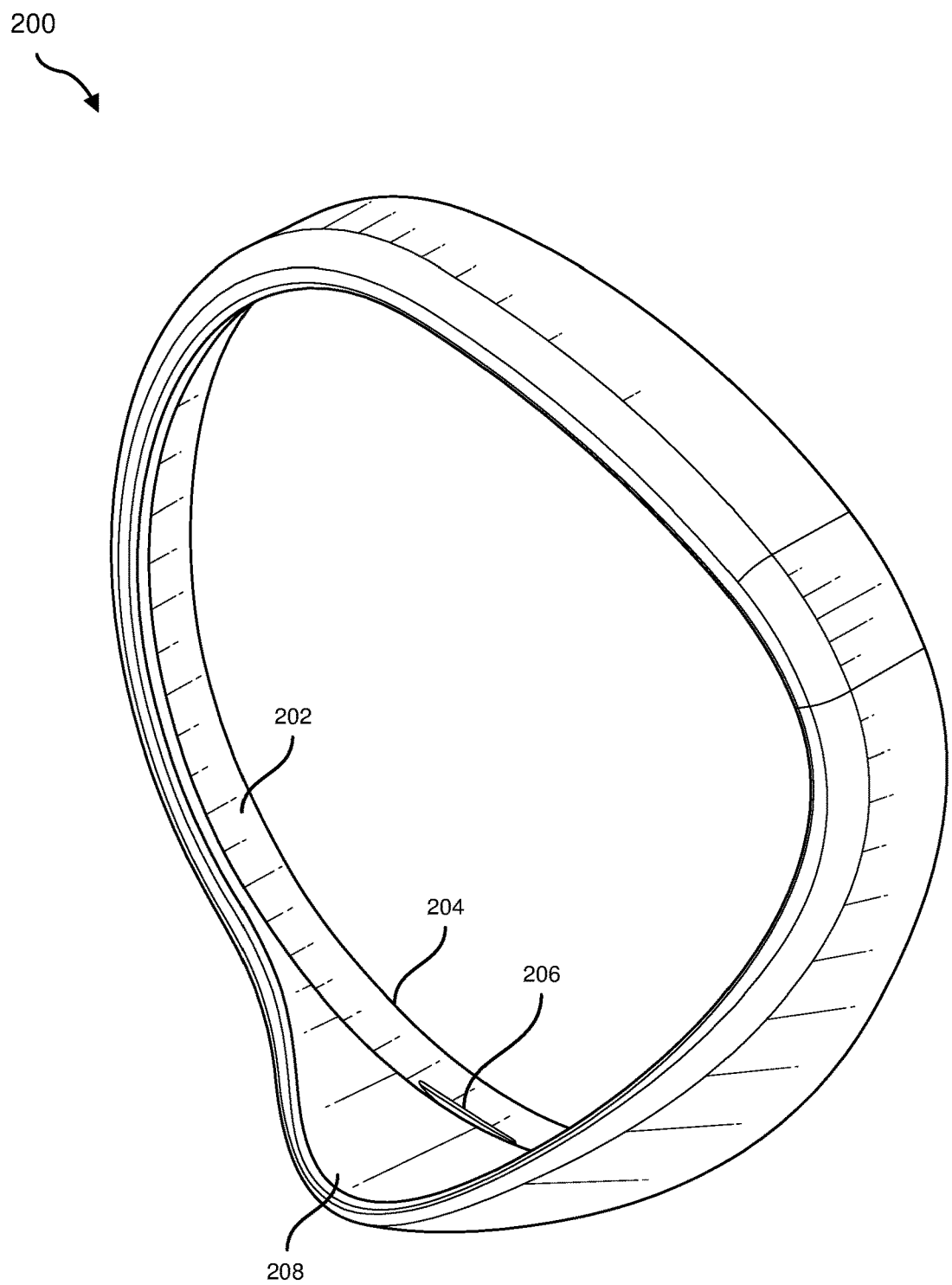
FIG. 2 is a perspective view of an exemplary light-blocker apparatus.

FIG. 2 illustrates a perspective view of an exemplary light-blocker apparatus 200. As shown in FIG. 2, light-blocker apparatus 200 may include a support element 202 and an attachment feature 206, defined at a base 204 of support element 202, to attach light-blocker apparatus 200 to another component, such as by snapping to fit around an eyecup. Additionally, light-blocker apparatus 200 may include an interface 208 extending from support element 202 and dimensioned to interface with an eye area of a user's face.

Figure 3A:
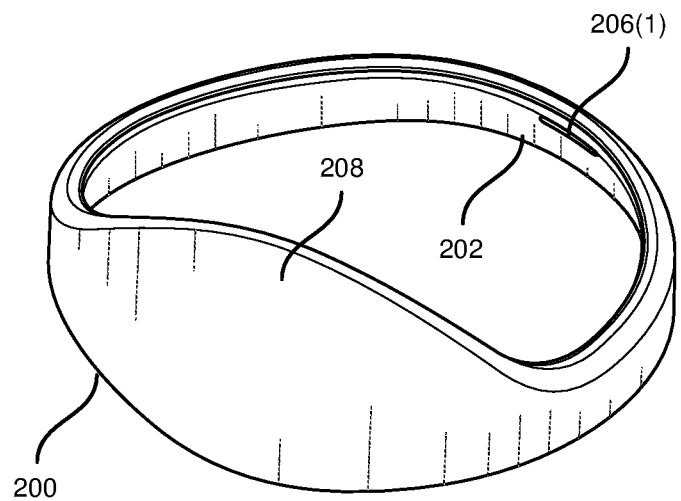
FIGS. 3A and 3B are additional perspective views of the exemplary light-blocker apparatus with exemplary attachment features.
Figure 3B:
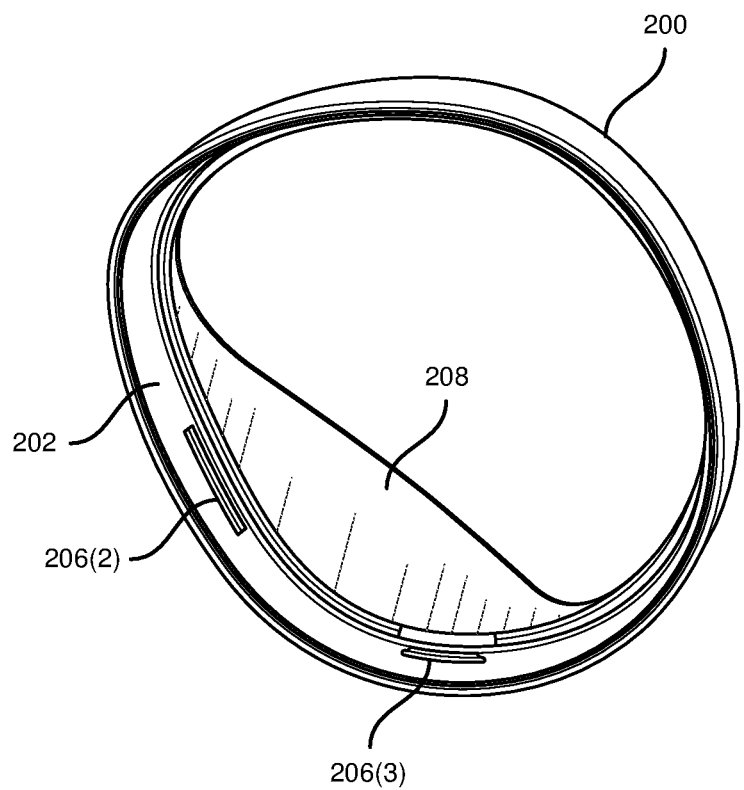

FIGS. 3A and 3B illustrate additional perspective views of light-blocker apparatus 200 with multiple attachment features 206(1)-(3). As shown in FIGS. 3A and 3B, attachment features 206(1)-(3) may be defined around the inner circumference of base 204 of support element 202 to snap to the outer circumference of an eyecup. By utilizing multiple attachment features around base 204, light-blocker apparatus 200 may improve the stability of attachment to the eyecup or other component. In additional embodiments, other types of attachment features may be utilized, such as clip mechanisms and/or friction-fit features.

Figure 4:
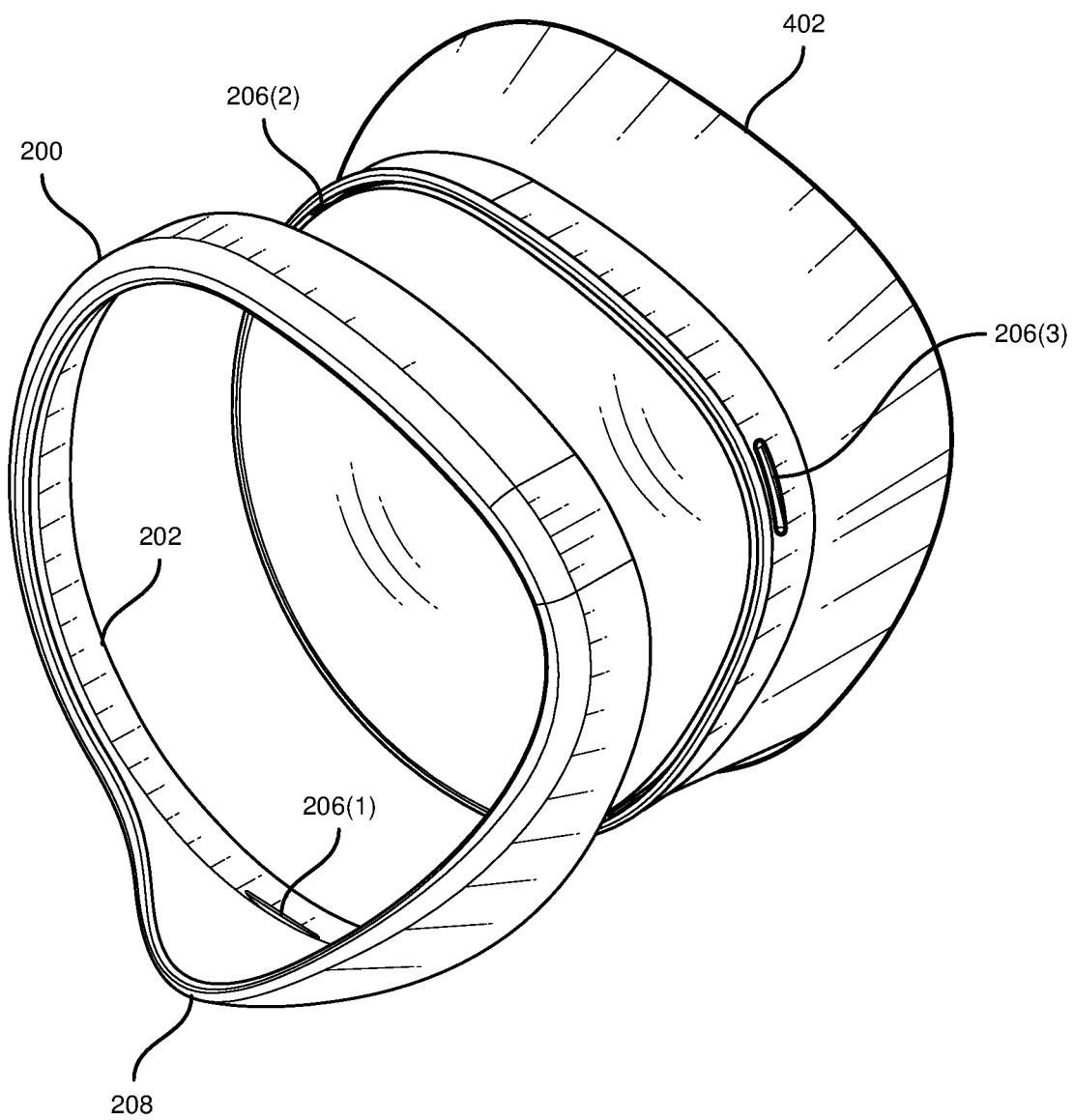
FIG. 4 is a perspective view of the attachment of the exemplary light-blocker apparatus to an exemplary eyecup.

FIG. 4 illustrates a perspective view of the attachment of light-blocker apparatus 200 to an exemplary eyecup 402. In the example of FIG. 4, support element 202 may be dimensioned to fit a contour of eyecup 402. As shown in FIG. 4, the contour of eyecup 402 may be a circular shape, and support element 202 may be molded as a circular ring that matches the outer contour of eyecup 402. In this example, attachment feature 206(1) and/or additional attachment features may attach to features on eyecup 402, such as attachment features 206(2)-(3), to connect support element 202 to eyecup 402. For example, attachment feature 206(1) may be a protrusion dimensioned to fit a groove, illustrated as attachment features 206(2) and/or 206(3), situated around eyecup 402. In various examples, attachment feature 206 may include a snap mechanism, a clip mechanism, and/or a friction-fit feature to removably attach support element 202 to eyecup 402. When support element 202 is attached to eyecup 402, support element 202 may then move in conjunction with eyecup 402.

In one embodiment, attachment feature 206(1) may removably attach support element 202 to eyecup 402. As shown in FIG. 4, attachment features 206(1)-(3) may be highly visible and easy to connect to eyecup 402. In an alternate embodiment, attachment feature 206(1) may irremovably integrate support element 202 with eyecup 402. In this embodiment, support element 202 may be permanently attached to eyecup 402 as an integrated part of a head-mounted display. In the above embodiments, support element 202 may include a rigid core material that inflexibly holds a molded shape based on the contour of eyecup 402. For example, a rigid material may enable support element 202 to easily snap or clip to eyecup 402 without adjustment. Alternatively, support element 202 may be dimensioned to directly extend from eyecup 402 as a part of eyecup 402.

Figure 5:
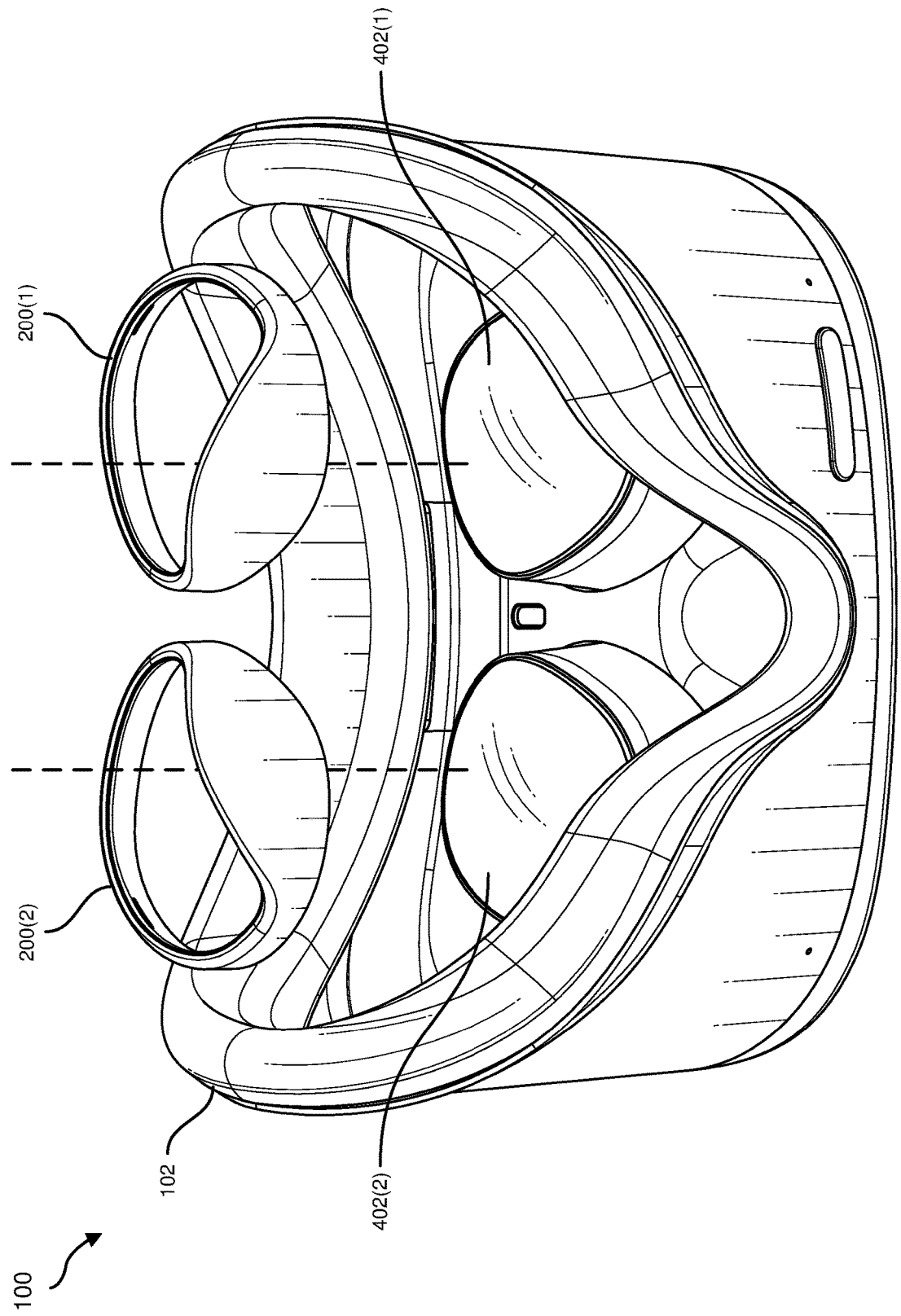
FIG. 5 is a perspective view of the attachment of exemplary light-blocker apparatuses to eyecups of the exemplary head-mounted display.

FIG. 5 illustrates a perspective view of the attachment of a right light-blocker apparatus 200(1) and a left light-blocker apparatus 200(2) to head-mounted display 100. As illustrated in FIG. 5, head-mounted display 100 may include a right eyecup 402(1) at an interface side of wearable frame 102 positioned to display an image to a right eye of a user and a separate left eyecup 402(2) positioned to display an additional image to a left eye of the user. In this example, right light-blocker apparatus 200(1) may attach to right eyecup 402(1) to move in conjunction with a movement of right eyecup 402(1), and left light-blocker apparatus 200(2) may attach to left eyecup 402(2) to move in conjunction with a movement of left eyecup 402(2).

In some embodiments, light-blocker apparatuses 200(1) and 200(2) may be added accessories to head-mounted display 100. In these embodiments, light-blocker apparatuses 200(1) and 200(2) may be removeable if head-mounted display 100 fits to a user's face without additional light blocking. In contrast, users such as user 104(2) of FIG. 1 may attach light-blocker apparatuses 200(1) and 200(2) to better block out light from head-mounted display 100 when worn. Furthermore, light-blocker apparatuses 200(1) and 200(2) may be labeled to distinguish between left and right light-blocker apparatuses to ensure fit to left and right eyecups.

Figure 6:
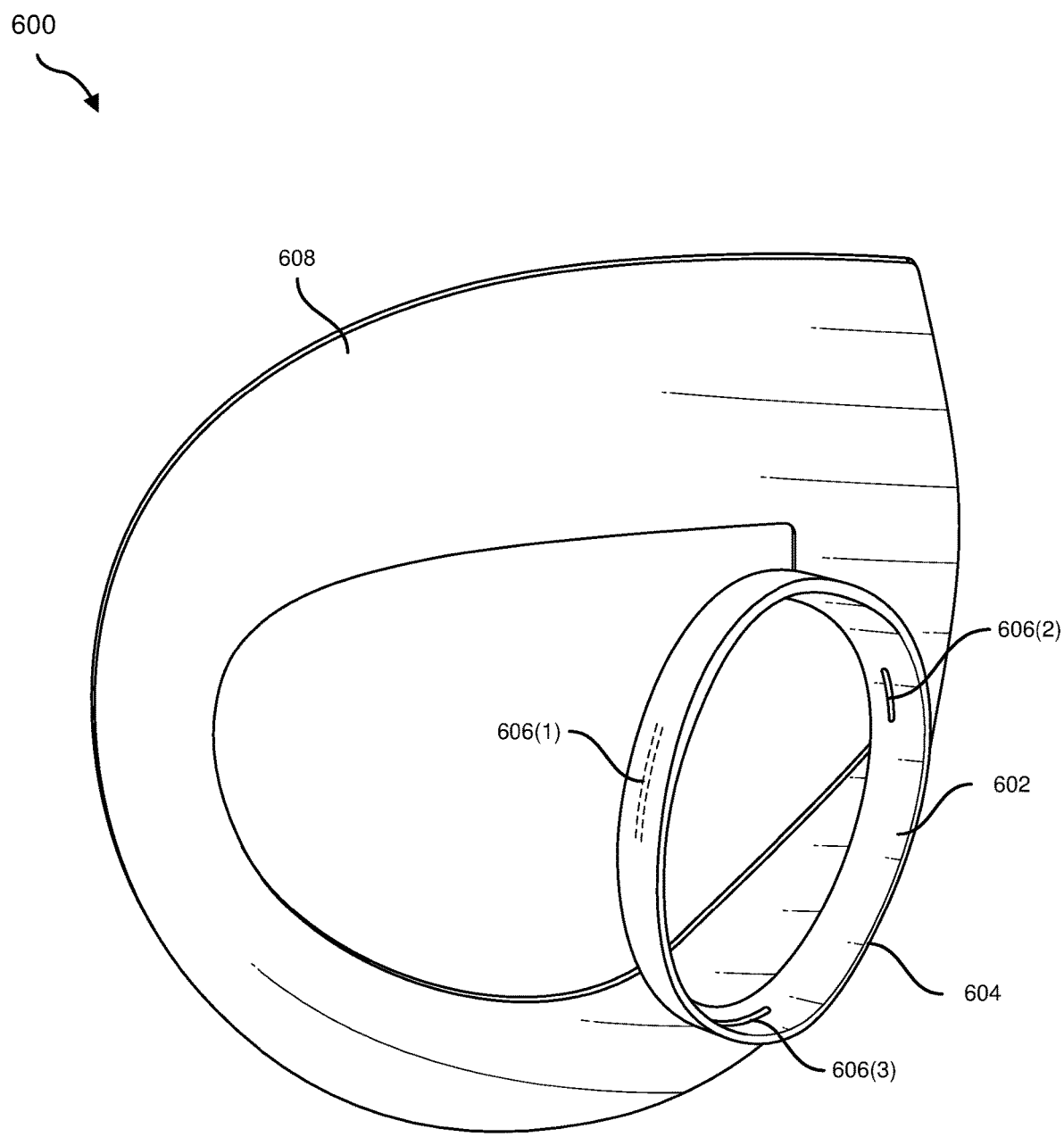
FIG. 6 is a perspective view of an additional exemplary light-blocker apparatus.

FIG. 6 illustrates a perspective view of an additional exemplary light-blocker apparatus 600. In this example, light-blocker apparatus 600 may include a support element 602 similar to support element 202 with attachment features 606(1)-(3) dimensioned around a base 604. However, an interface 608 of light-blocker apparatus 600 may interface with a larger portion of a user's eye area than interface 208 of light-blocker apparatus 200. In other examples, variations of shapes of interface 608 and/or support element 602 may be defined to better fit variations in eye areas (including, for example, interpupillary distance) or differences in face shapes and sizes.

Figure 7:
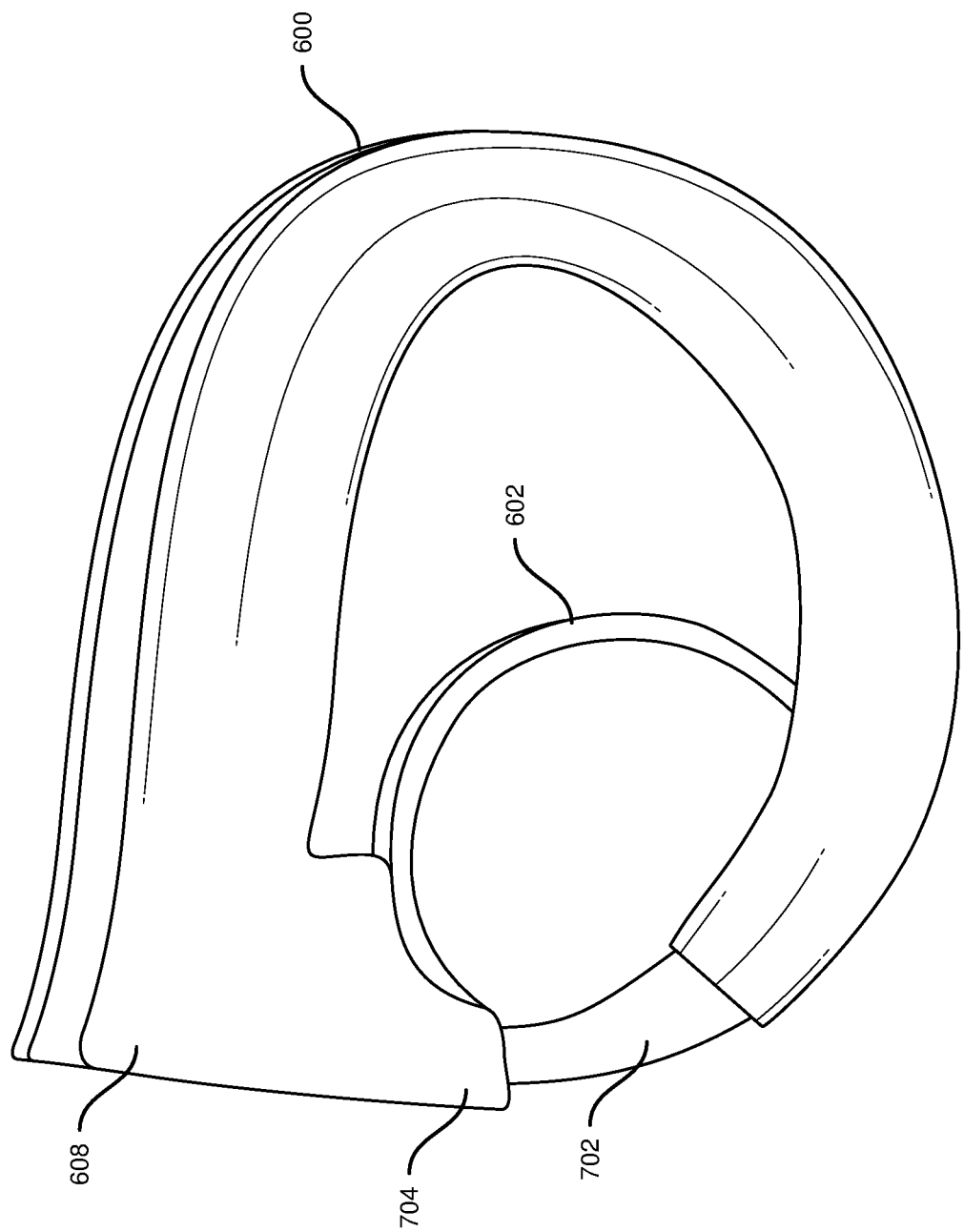
FIG. 7 is a perspective view of the additional exemplary light-blocker apparatus comprising multiple exemplary materials.

FIG. 7 illustrates an alternate view of light-blocker apparatus 600. In some embodiments, interface 608 may include a rigid material, such as the rigid core material of support element 202, and/or may include a pliant interface material. In these embodiments, interface 608 may be molded to fit a contour shape around a user's eye area and maintain a flexibility to account for individual differences between users. As shown in FIG. 7, interface 608 may include a rigid core material 702 extended from support element 602 that is covered by a pliant interface material 704.

In one example, light-blocker apparatus 600 may be formed from single-shot molding to reduce manufacturing costs. In this example, support element 602 may fit to an eyecup with friction fit. In other examples, light-blocker apparatus 600 may be formed from double-shot molding using multiple materials, such as a combination of lightweight silicone, polycarbonate, rubber, plastic, injection molding, injection foam, reticulated foam, and/or other suitable materials. Using multiple materials may enable a portion of light-blocker apparatus 600, such as support element 602, to remain rigid while other portions, such as interface 608 are semi-rigid or pliant to better fit to a user's face. In these examples, support element 602 may fit to an eyecup by snapping or clipping with more robust features that are less likely to unintentionally move.

Figure 8:
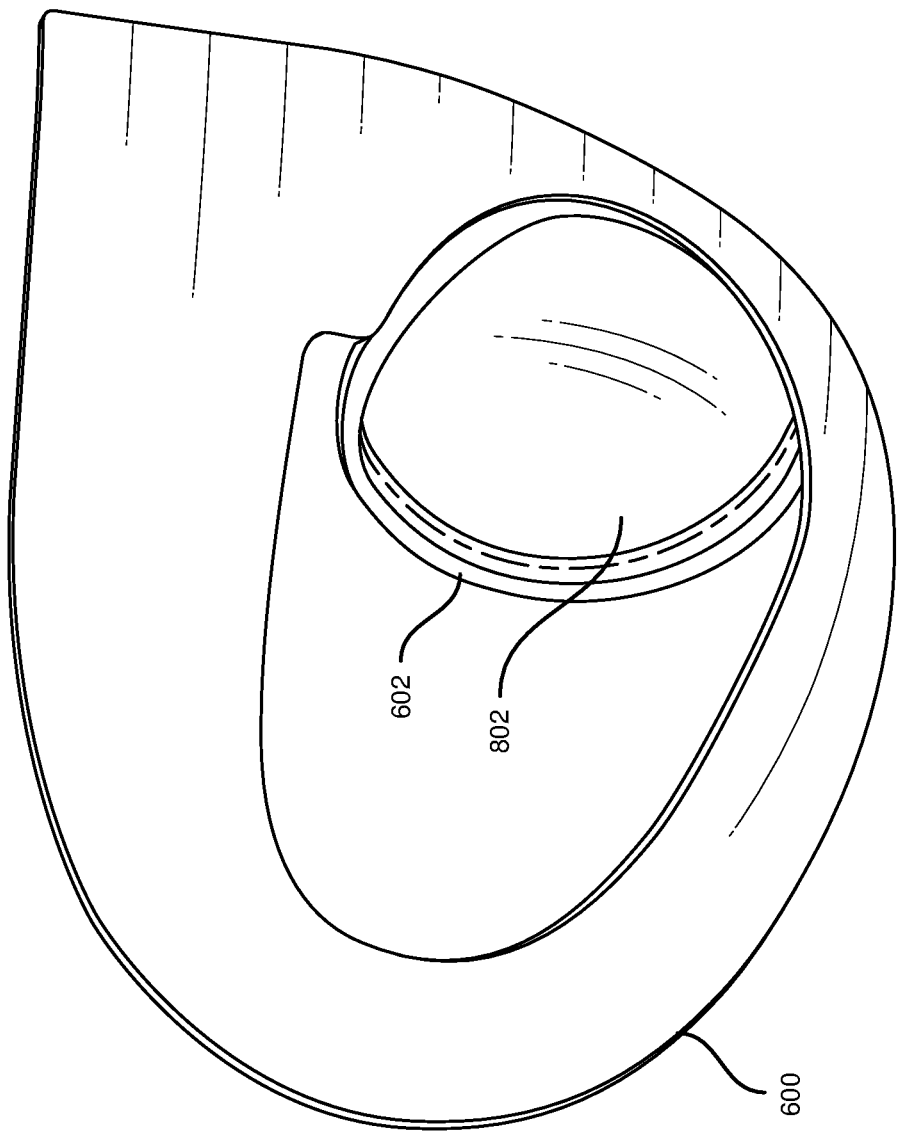
FIG. 8 is a perspective view of an exemplary prescription lens fitted to the additional exemplary light-blocker apparatus.

FIG. 8 illustrates a perspective view of an exemplary prescription lens 802 fitted to light-blocker apparatus 600. In the example of FIG. 8, prescription lens 802 may be dimensioned to be inserted into support element 602 such that prescription lens 802 distorts an image displayed by an eyecup when support element 602 is attached to the eyecup. In this example, prescription lens 802 may be integrated with existing light-blocker apparatus 600.

In other examples, support element 602 may be dimensioned to fit a contour of a prescription lens attachment dimensioned to be attached to an eyecup. In these examples, attachment features may connect support element 602 to the prescription lens attachment, rather than directly to the eyecup. Additionally, in these examples, light-blocker apparatus 600 may be integrated with or fitted to prescription lens attachments. This may provide light blocking improvements to the prescription lens attachments.

Figure 9:
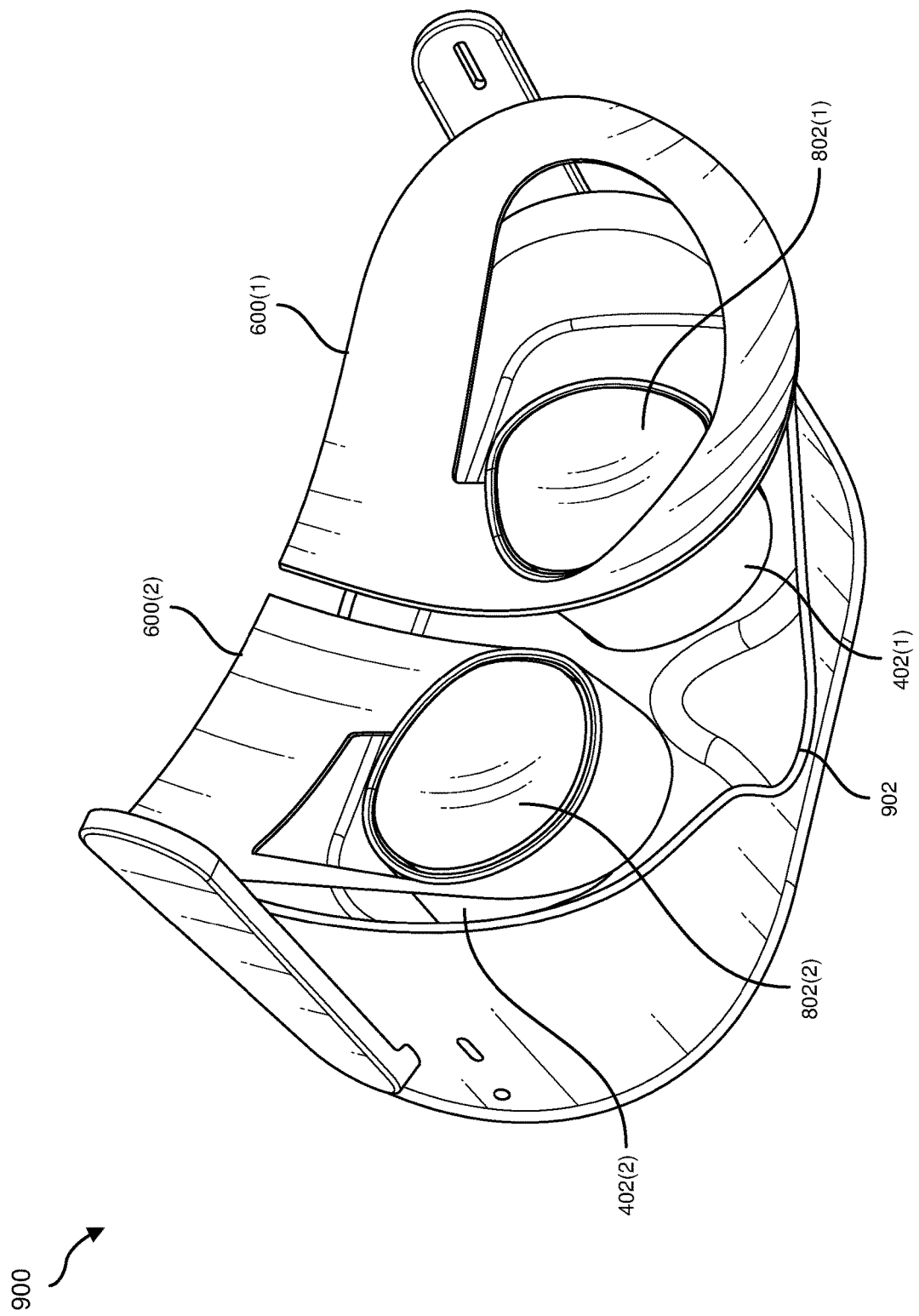
FIG. 9 is a perspective view of an additional exemplary head-mounted display fitted with the additional exemplary light-blocker apparatuses.

FIG. 9 illustrates a perspective view of an additional exemplary head-mounted display 900 fitted with a right light-blocker apparatus 600(1) and a left light-blocker apparatus 600(2). In some examples, light-blocker apparatuses 600(1) and 600(2) may be irremovably integrated with eyecups 402(1) and 402(2), respectively. Additionally, right light-blocker apparatus 600(1) and left light-blocker apparatus 600(2) may be integrated with prescription lenses 802(1) and 802(2) of different prescriptions, which may be customized to each user. Due to the unique shapes of light-blocker apparatuses 600(1) and 600(2), left and right components may not require labeling to easily distinguish between placement positions.

As shown in FIG. 9, head-mounted display 900 may include a nose contact feature 902 dimensioned to interface with a user's nose to reduce light from outside of head-mounted display 900 from entering right eyecup 402(1) and/or left eyecup 402(2). In this example, nose contact feature 902 may provide additional light blocking from light leakage around a bridge of the user's nose in addition to light-blocker apparatuses 600(1) and 600(2). In alternate examples, nose contact feature 902 may be integrated with light-blocker apparatuses 600(1) and 600(2).

Figure 10B:
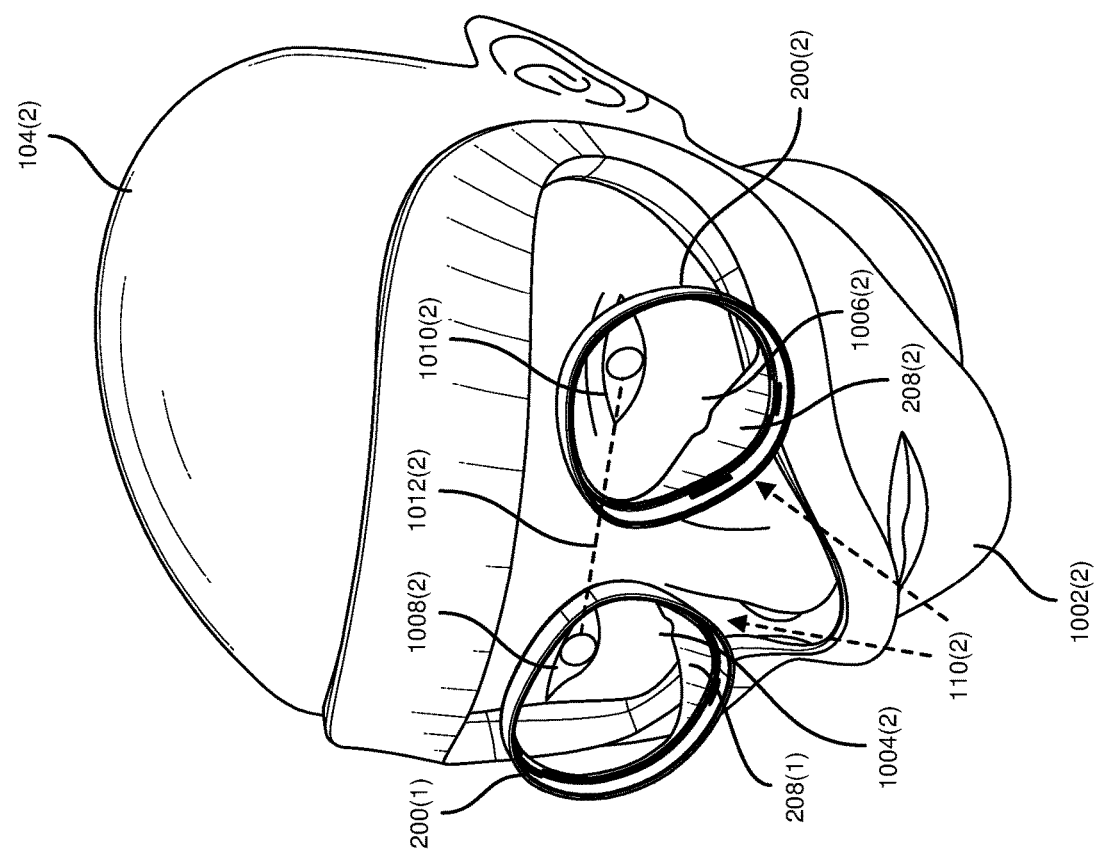
FIGS. 10A and 10B are perspective views of exemplary light-blocker apparatuses interfacing with exemplary user faces.
Figure 10A:
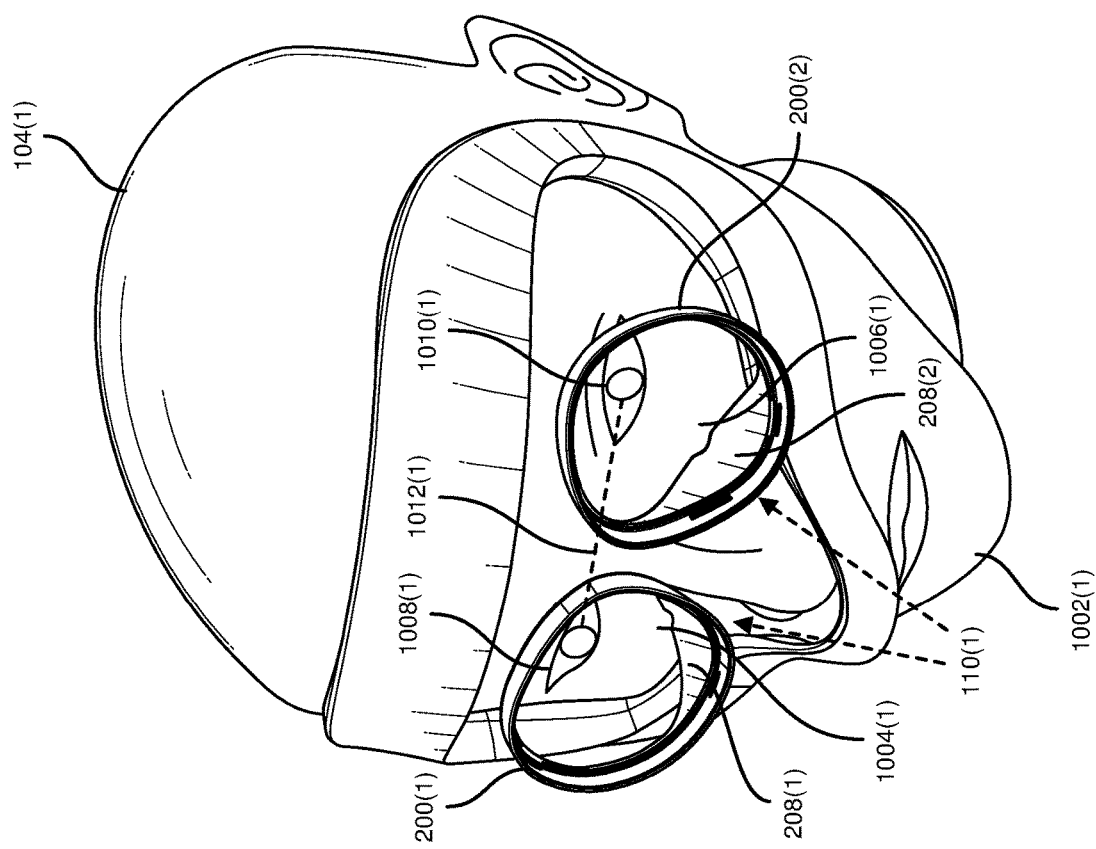

FIGS. 10A and 10B illustrate perspective views of light-blocker apparatuses 200(1) and 200(2) interfacing with user faces 1002(1) and 1002(2) of users 104(1) and 104(2). In this embodiment, light-blocker apparatuses 200(1) and 200(2) are dimensioned to reduce light entering eyecups from outside of a head-mounted display when worn by users 104(1) and 104(2). For example, light-blocker apparatuses 200(1) and 200(2) may block light 110(1) and 110(2) from around the noses of users 104(1) and 104(2).

As shown in FIG. 10A, an interface 208(1) of right light-blocker apparatus 200(1) interfaces with a right eye area 1004(1) while an interface 208(2) of left light-blocker apparatus 200(2) interfaces with a left eye area 1006(1) of user 104(1). In this example, a pliant interface material of interface 208(1) may flexibly adjust to interface with right eye area 1004(1), and interface 208(2) may flexibly adjust to interface with left eye area 1006(1), illustrated as flexibly bending in reaction to pressure from contact with face 1002(1). Due to the pliant interface material, interface 208(1) and interface 208(2) may create a better seal against the skin of user's face 1002(1). Similarly, interface 208(1) and interface 208(2) may flexibly interface with a right eye area 1004(2) and a left eye area 1006(2) of user 104(2).

In some embodiments, a right eyecup may be adjustably positioned to a position of a right eye 1008(1) of user 104(1) while a left eyecup may be adjustably positioned to a position of a left eye 1010(1) of user 104(1). In this example, user 104(1) may have a smaller interpupillary distance 1012(1), and light-blocker apparatuses 200(1) and 200(2) may be positioned closer together in tangent with the eyecups. In contrast, user 104(2) may have a larger interpupillary distance 1012(2) between a right eye 1008(2) and a left eye 1010(2). In this embodiment, the right eyecup and the left eyecup may be adjustably positioned based on interpupillary distance 1012(2) by adjusting a distance between the right eyecup and the left eyecup. Thus, light-blocker apparatuses 200(1) and 200(2) may be positioned farther apart to better fit user 104(2).

Figure 11A:
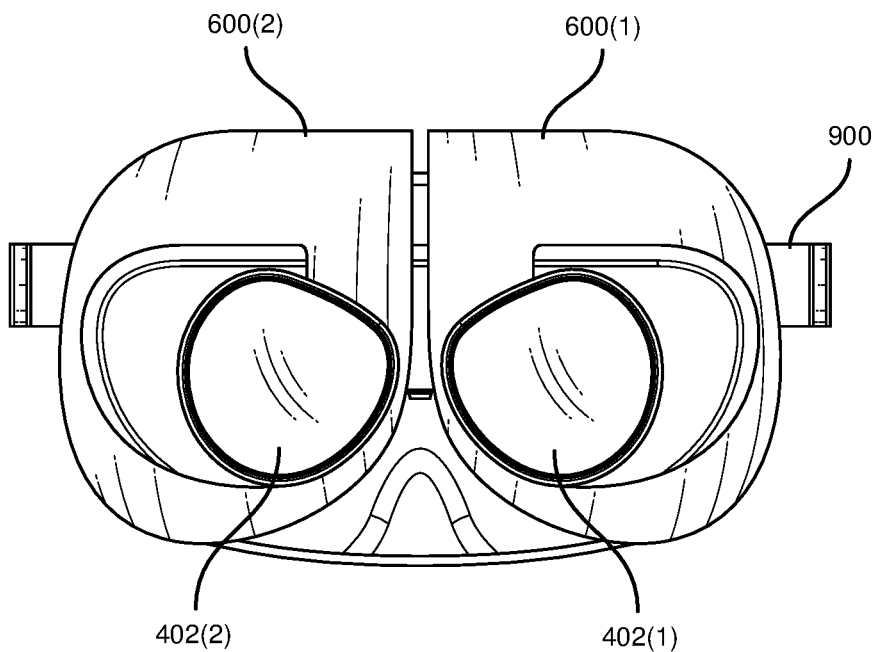
FIGS. 11A and 11B are back views of the additional exemplary head-mounted display with varying light-blocker apparatus and eyecup positions.
Figure 11B:
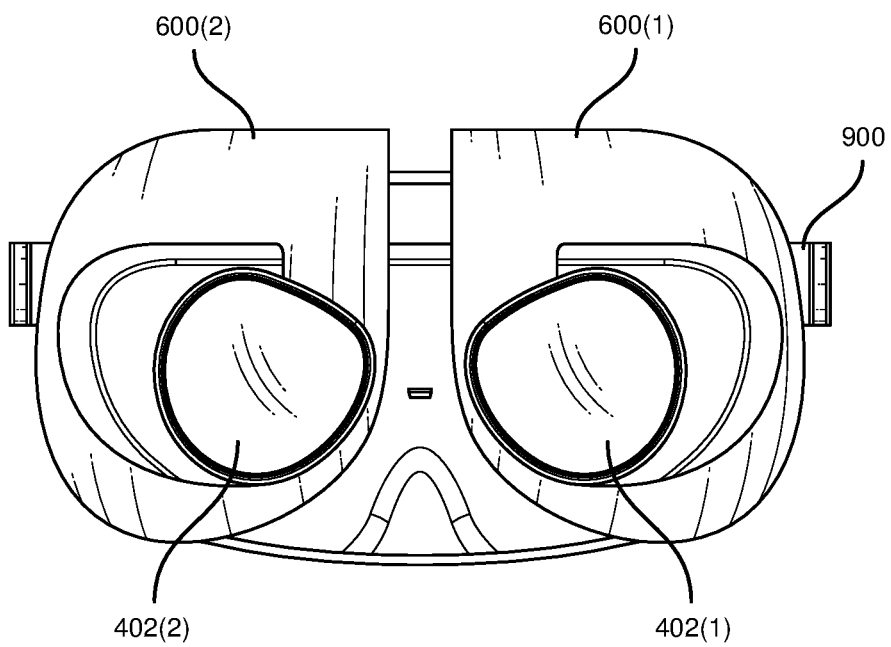

FIGS. 11A and 11B illustrate back views of head-mounted display 900 with varying light-blocker apparatus and eyecup positions. As shown in FIG. 11A, light-blocker apparatuses 600(1) and 600(2) may be positioned closer together in tangent with eyecups 402(1) and 402(2), such as for user 104(1) of FIG. 10A. In contrast, as shown in FIG. 11B, light-blocker apparatuses 600(1) and 600(2) may be adjustably moved farther apart in tangent with eyecups 402(1) and 402(2) to fit other users, such as user 104(2) of FIG. 10B. In these embodiments, eyecups 402(1) and 402(2) may slide together and apart. In other embodiments, eyecups 402(1) and 402(2) may snap to specific positions or otherwise be fixated at a desirable distance.

Figure 12:
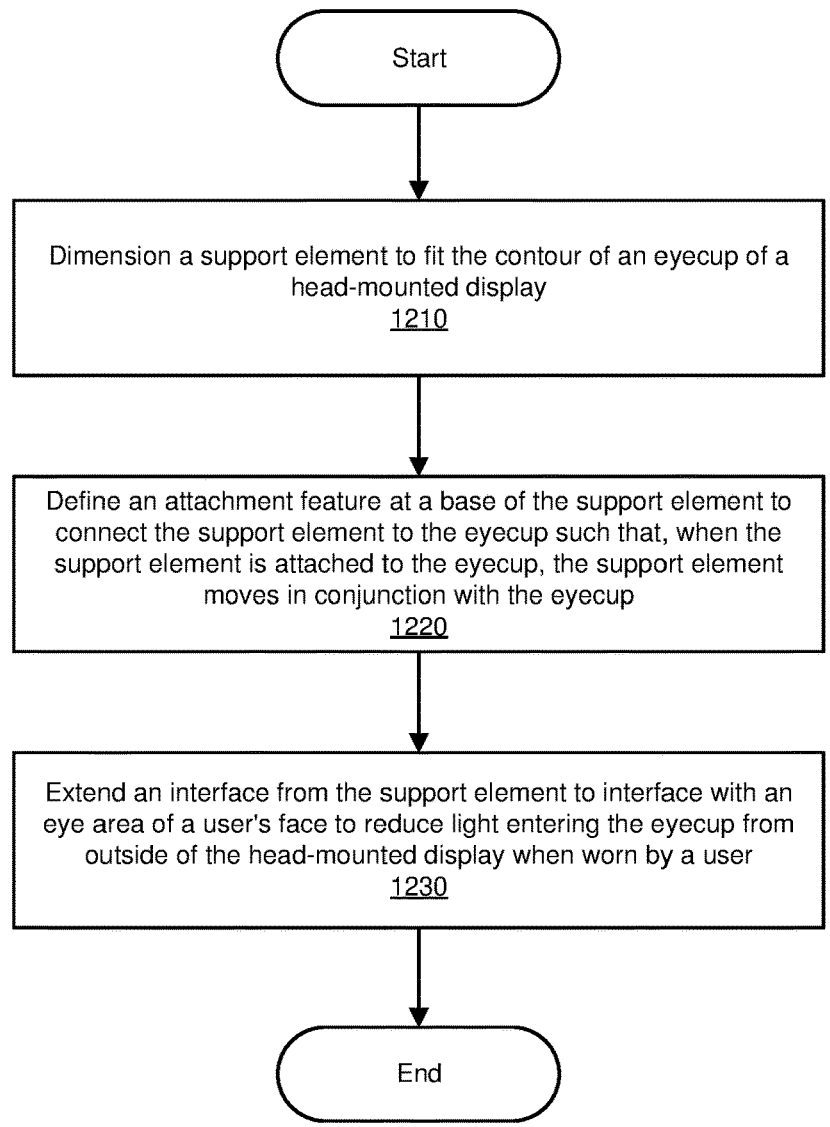
FIG. 12 is a flow diagram of an exemplary method for manufacturing a light-blocker apparatus.

FIG. 12 shows an example method for manufacturing, assembling, using, adjusting, or otherwise configuring or creating the systems and apparatuses presented herein. The steps shown in FIG. 12 may be performed by any individual and/or by any suitable type or form of manual and/or automated apparatus. In particular, FIG. 12 illustrates a flow diagram of an exemplary method 1200 for manufacturing light-blocker apparatuses.

As shown in FIG. 12, at step 1210, one or more of the systems described herein may dimension a support element to fit a contour of an eyecup of a head-mounted display. For example, as illustrated in FIG. 4, support element 202 may be dimensioned to fit a contour of eyecup 402 of head-mounted display 100 of FIG. 5.

The systems described herein may perform step 1210 of FIG. 12 in a variety of ways. As shown in FIG. 4, support element 202 may include a rigid core material dimensioned to hold a molded shape based on the contour of eyecup 402. In other examples, such as light-blocker apparatus 600 of FIG. 7, support element 602 may be dimensioned to create a friction fit over an eyecup.

Returning to FIG. 12, at step 1220, one or more of the systems described herein may define an attachment feature at a base of the support element to connect the support element to the eyecup such that, when the support element is attached to the eyecup, the support element moves in conjunction with the eyecup. For example, as illustrated in FIGS. 3A and 3B, attachment features 206(1)-(3) may be defined at base 204 of support element 202 to connect support element 202 to eyecup 402 of FIG. 4 such that support element moves in conjunction with eyecup 402.

The systems described herein may perform step 1220 of FIG. 12 in a variety of ways. In some examples, defining the attachment feature to connect the support element to the eyecup may include defining the attachment feature to irremovably integrate the support element with the eyecup. Additionally or alternatively, the attachment feature may be defined to removably attach the support element to the eyecup, such as the example of FIG. 4.

Returning to FIG. 12, at step 1230, one or more of the systems described herein may extend an interface from the support element to interface with an eye area of a user's face to reduce light entering the eyecup from outside of the head-mounted display when worn by a user. For example, as illustrated in FIG. 10A, interface 208(1) may be extended to interface with right eye area 1004(1) to reduce light 110(1) entering an eyecup from outside of a head-mounted display when worn by user 104(1).

The systems described herein may perform step 1230 of FIG. 12 in a variety of ways. In one embodiment, extending the interface from the support element may include extending a rigid core material of the support element to interface with the eye area of the user's face. Additionally or alternatively, extending the interface from the support element may include covering the rigid core material with a pliant material that flexibly adjusts to interface with the eye area of the user's face when the head-mounted display is worn by the user, such as the dual material construction of FIG. 7.

In some examples, method 1200 may further include a step in which the support element is dimensioned to fit a contour of a prescription lens attachment dimensioned to be attached to the eyecup. For example, support element 602 of FIG. 8 may be dimensioned to fit prescription lens 802.

Figure 13:
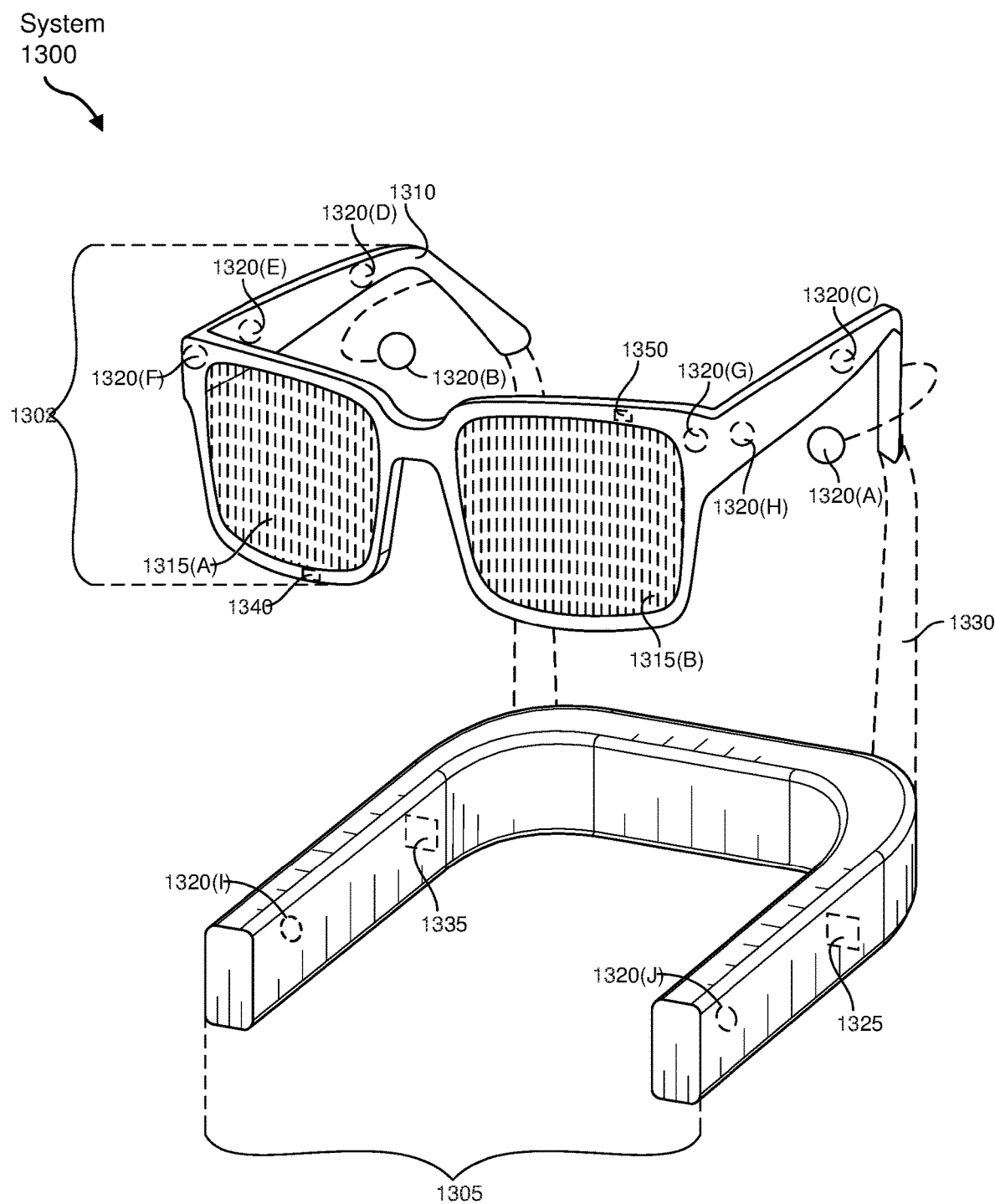
FIG. 13 is an illustration of exemplary augmented-reality glasses that may be used in connection with embodiments of this disclosure.

Although generally illustrated as fitting to eyecups of a head-mounted display, light-blocker apparatuses may be fitted to other apparatuses or systems, such as augmented-reality system 1300 in FIG. 13, virtual-reality system 1400 in FIG. 14, a video camera with a single eyecup, and/or other mechanisms requiring light blocking from an eye area.

As discussed throughout the present disclosure, the disclosed methods, systems, and apparatuses may provide one or more advantages over traditional facial interfacing methods to block out light that may disrupt the immersive experience of artificial or virtual reality. For example, traditional facial interface features may block out light via a facial interface that attempts to block light from around a user's nose, but ambient light may penetrate traditional head-mounted displays due to different nose shapes and sizes. In contrast, each eyecup in the head-mounted display of the present disclosure may be fitted with a light-blocker apparatus that moves tangentially with the eyecup and fits to the user's face around the eye area, which may have less variation than noses and may be more consistent between users. Using flexible fit around the eye area, the methods, systems, and apparatuses described herein may provide better light blocking fora larger variety user faces. Additionally, with attachment features that may enable light blockers to be removed, the disclosed methods, systems, and apparatuses may enable users to select different light-blocker apparatuses as appropriate. Furthermore, by optionally integrating light blockers with prescription lenses, the disclosed methods, systems, and apparatuses may provide additional customizability for users. Thus, the methods, systems, and apparatuses described herein may improve light blocking while accounting for anatomical variations between users.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1300 in FIG. 13) or that visually immerses a user in an artificial reality (such as, e.g., virtual-reality system 1400 in FIG. 14). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 13, augmented-reality system 1300 may include an eyewear device 1302 with a frame 1310 configured to hold a left display device 1315(A) and a right display device 1315(B) in front of a user's eyes. Display devices 1315(A) and 1315(B) may act together or independently to present an image or series of images to a user. While augmented-reality system 1300 includes two displays, embodiments of this disclosure may be implemented in augmented-reality systems with a single NED or more than two NEDs.

In some embodiments, augmented-reality system 1300 may include one or more sensors, such as sensor 1340. Sensor 1340 may generate measurement signals in response to motion of augmented-reality system 1300 and may be located on substantially any portion of frame 1310. Sensor 1340 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1300 may or may not include sensor 1340 or may include more than one sensor. In embodiments in which sensor 1340 includes an IMU, the IMU may generate calibration data based on measurement signals from sensor 1340. Examples of sensor 1340 may include, without limitation, accelerometers, gyroscopes, magnetometers, other suitable types of sensors that detect motion, sensors used for error correction of the IMU, or some combination thereof.

In some examples, augmented-reality system 1300 may also include a microphone array with a plurality of acoustic transducers 1320(A)-1320(J), referred to collectively as acoustic transducers 1320. Acoustic transducers 1320 may represent transducers that detect air pressure variations induced by sound waves. Each acoustic transducer 1320 may be configured to detect sound and convert the detected sound into an electronic format (e.g., an analog or digital format). The microphone array in FIG. 14 may include, for example, ten acoustic transducers: 1320(A) and 1320(B), which may be designed to be placed inside a corresponding ear of the user, acoustic transducers 1320(C), 1320(D), 1320(E), 1320(F), 1320(G), and 1320(H), which may be positioned at various locations on frame 1310, and/or acoustic transducers 1320(I) and 1320(J), which may be positioned on a corresponding neckband 1305.

In some embodiments, one or more of acoustic transducers 1320(A)-(F) may be used as output transducers (e.g., speakers). For example, acoustic transducers 1320(A) and/or 1320(B) may be earbuds or any other suitable type of headphone or speaker.

The configuration of acoustic transducers 1320 of the microphone array may vary. While augmented-reality system 1300 is shown in FIG. 13 as having ten acoustic transducers 1320, the number of acoustic transducers 1320 may be greater or less than ten. In some embodiments, using higher numbers of acoustic transducers 1320 may increase the amount of audio information collected and/or the sensitivity and accuracy of the audio information. In contrast, using a lower number of acoustic transducers 1320 may decrease the computing power required by an associated controller 1350 to process the collected audio information. In addition, the position of each acoustic transducer 1320 of the microphone array may vary. For example, the position of an acoustic transducer 1320 may include a defined position on the user, a defined coordinate on frame 1310, an orientation associated with each acoustic transducer 1320, or some combination thereof.

Acoustic transducers 1320(A) and 1320(B) may be positioned on different parts of the user's ear, such as behind the pinna, behind the tragus, and/or within the auricle or fossa. Or, there may be additional acoustic transducers 1320 on or surrounding the ear in addition to acoustic transducers 1320 inside the ear canal. Having an acoustic transducer 1320 positioned next to an ear canal of a user may enable the microphone array to collect information on how sounds arrive at the ear canal. By positioning at least two of acoustic transducers 1320 on either side of a user's head (e.g., as binaural microphones), augmented-reality device 1300 may simulate binaural hearing and capture a 3D stereo sound field around about a user's head. In some embodiments, acoustic transducers 1320(A) and 1320(B) may be connected to augmented-reality system 1300 via a wired connection 1330, and in other embodiments acoustic transducers 1320(A) and 1320(B) may be connected to augmented-reality system 1300 via a wireless connection (e.g., a Bluetooth connection). In still other embodiments, acoustic transducers 1320(A) and 1320(B) may not be used at all in conjunction with augmented-reality system 1300.

Acoustic transducers 1320 on frame 1310 may be positioned in a variety of different ways, including along the length of the temples, across the bridge, above or below display devices 1315(A) and 1315(B), or some combination thereof. Acoustic transducers 1320 may also be oriented such that the microphone array is able to detect sounds in a wide range of directions surrounding the user wearing the augmented-reality system 1300. In some embodiments, an optimization process may be performed during manufacturing of augmented-reality system 1300 to determine relative positioning of each acoustic transducer 1320 in the microphone array.

In some examples, augmented-reality system 1300 may include or be connected to an external device (e.g., a paired device), such as neckband 1305. Neckband 1305 generally represents any type or form of paired device. Thus, the following discussion of neckband 1305 may also apply to various other paired devices, such as charging cases, smart watches, smart phones, wrist bands, other wearable devices, hand-held controllers, tablet computers, laptop computers, other external compute devices, etc.

As shown, neckband 1305 may be coupled to eyewear device 1302 via one or more connectors. The connectors may be wired or wireless and may include electrical and/or non-electrical (e.g., structural) components. In some cases, eyewear device 1302 and neckband 1305 may operate independently without any wired or wireless connection between them. While FIG. 13 illustrates the components of eyewear device 1302 and neckband 1305 in example locations on eyewear device 1302 and neckband 1305, the components may be located elsewhere and/or distributed differently on eyewear device 1302 and/or neckband 1305. In some embodiments, the components of eyewear device 1302 and neckband 1305 may be located on one or more additional peripheral devices paired with eyewear device 1302, neckband 1305, or some combination thereof.

Pairing external devices, such as neckband 1305, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1300 may be provided by a paired device or shared between a paired device and an eyewear device, thus reducing the weight, heat profile, and form factor of the eyewear device overall while still retaining desired functionality. For example, neckband 1305 may allow components that would otherwise be included on an eyewear device to be included in neckband 1305 since users may tolerate a heavier weight load on their shoulders than they would tolerate on their heads. Neckband 1305 may also have a larger surface area over which to diffuse and disperse heat to the ambient environment. Thus, neckband 1305 may allow for greater battery and computation capacity than might otherwise have been possible on a stand-alone eyewear device. Since weight carried in neckband 1305 may be less invasive to a user than weight carried in eyewear device 1302, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1305 may be communicatively coupled with eyewear device 1302 and/or to other devices. These other devices may provide certain functions (e.g., tracking, localizing, depth mapping, processing, storage, etc.) to augmented-reality system 1300. In the embodiment of FIG. 13, neckband 1305 may include two acoustic transducers (e.g., 1320(1) and 1320(J)) that are part of the microphone array (or potentially form their own microphone subarray). Neckband 1305 may also include a controller 1325 and a power source 1335.

Acoustic transducers 1320(1) and 1320(J) of neckband 1305 may be configured to detect sound and convert the detected sound into an electronic format (analog or digital). In the embodiment of FIG. 13, acoustic transducers 1320(1) and 1320(J) may be positioned on neckband 1305, thereby increasing the distance between the neckband acoustic transducers 1320(1) and 1320(J) and other acoustic transducers 1320 positioned on eyewear device 1302. In some cases, increasing the distance between acoustic transducers 1320 of the microphone array may improve the accuracy of beamforming performed via the microphone array. For example, if a sound is detected by acoustic transducers 1320(C) and 1320(D) and the distance between acoustic transducers 1320(C) and 1320(D) is greater than, e.g., the distance between acoustic transducers 1320(D) and 1320(E), the determined source location of the detected sound may be more accurate than if the sound had been detected by acoustic transducers 1320(D) and 1320(E).

Controller 1325 of neckband 1305 may process information generated by the sensors on neckband 1305 and/or augmented-reality system 1300. For example, controller 1325 may process information from the microphone array that describes sounds detected by the microphone array. For each detected sound, controller 1325 may perform a direction-of-arrival (DOA) estimation to estimate a direction from which the detected sound arrived at the microphone array. As the microphone array detects sounds, controller 1325 may populate an audio data set with the information. In embodiments in which augmented-reality system 1300 includes an inertial measurement unit, controller 1325 may compute all inertial and spatial calculations from the IMU located on eyewear device 1302. A connector may convey information between augmented-reality system 1300 and neckband 1305 and between augmented-reality system 1300 and controller 1325. The information may be in the form of optical data, electrical data, wireless data, or any other transmittable data form. Moving the processing of information generated by augmented-reality system 1300 to neckband 1305 may reduce weight and heat in eyewear device 1302, making it more comfortable to the user.

Power source 1335 in neckband 1305 may provide power to eyewear device 1302 and/or to neckband 1305. Power source 1335 may include, without limitation, lithium ion batteries, lithium-polymer batteries, primary lithium batteries, alkaline batteries, or any other form of power storage. In some cases, power source 1335 may be a wired power source. Including power source 1335 on neckband 1305 instead of on eyewear device 1302 may help better distribute the weight and heat generated by power source 1335.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1400 in FIG. 14, that mostly or completely covers a user's field of view. Virtual-reality system 1400 may include a front rigid body 1402 and a band 1404 shaped to fit around a user's head. Virtual-reality system 1400 may also include output audio transducers 1406(A) and 1406(B). Furthermore, while not shown in FIG. 14, front rigid body 1402 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1300 and/or virtual-reality system 1400 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in augmented-reality system 1300 and/or virtual-reality system 1400 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1300 and/or virtual-reality system 1400 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

When the user is wearing an augmented-reality headset or virtual-reality headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to as "localization," and the process of rendering playback of the audio source signal to appear as if it is coming from a specific direction may be referred to as "spatialization."

Localizing an audio source may be performed in a variety of different ways. In some cases, an augmented-reality or virtual-reality headset may initiate a DOA analysis to determine the location of a sound source. The DOA analysis may include analyzing the intensity, spectra, and/or arrival time of each sound at the artificial-reality device to determine the direction from which the sounds originated. The DOA analysis may include any suitable algorithm for analyzing the surrounding acoustic environment in which the artificial-reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique HRTF, which may be dictated by a user's anatomy including ear canal length and the positioning of the ear drum. The artificial-reality device may provide an alignment and orientation guide, which the user may follow to customize the sound signal presented to the user based on their unique HRTF. In some embodiments, an artificial-reality device may implement one or more microphones to listen to sounds within the user's environment. The augmented-reality or virtual-reality headset may use a variety of different array transfer functions (e.g., any of the DOA algorithms identified above) to estimate the direction of arrival for the sounds. Once the direction of arrival has been determined, the artificial-reality device may play back sounds to the user according to the user's unique HRTF. Accordingly, the DOA estimation generated using the ATF may be used to determine the direction from which the sounds are to be played from. The playback sounds may be further refined based on how that specific user hears sounds according to the HRTF.

In addition to or as an alternative to performing a DOA estimation, an artificial-reality device may perform localization based on information received from other types of sensors. These sensors may include cameras, IR sensors, heat sensors, motion sensors, GPS receivers, or in some cases, sensors that detect a user's eye movements. For example, as noted above, an artificial-reality device may include an eye tracker or gaze detector that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial-reality device may include one or more acoustic sensors that detect sounds within range of the device. A controller of the artificial-reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial-reality device may re-render (i.e., spatialize) the sound signals to sound as if coming from the direction of that sound source. The artificial-reality device may apply filters or other digital signal processing that alter the intensity, spectra, or arrival time of the sound signal. The digital signal processing may be applied in such a way that the sound signal is perceived as originating from the determined location. The artificial-reality device may amplify or subdue certain frequencies or change the time that the signal arrives at each ear. In some cases, the artificial-reality device may create an acoustic transfer function that is specific to the location of the device and the detected direction of arrival of the sound signal. In some embodiments, the artificial-reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial-reality device (or speakers associated with the device) may re-render an audio signal to sound as if originating from a specific location.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A light-blocker apparatus comprising:
a support element dimensioned to fit a contour of an eyecup of a head-mounted display and dimensioned to hold a prescription lens attachment, wherein the support element entirely comprises a rigid core material that enables the support element to:
 inflexibly hold a molded shape to facilitate attachment to the eyecup; and
 integrate the prescription lens attachment;
an attachment feature, defined at a base of the support element, that connects the support element to the eyecup such that, when the support element is attached to the eyecup, the support element moves in conjunction with an adjustment of the eyecup to fit a user; and
an interface extending from the support element and dimensioned to interface with an eye area of a user's face to reduce light entering the eyecup from outside of the head-mounted display when worn by the user, wherein the interface comprises a dual-material construction comprising:
 the rigid core material of the support element that extends from the support element toward the eye area of the user's face; and
 a pliant interface material that is more flexible than the rigid core material of the support element and that is molded to cover the rigid core material to interface with the eye area of the user's face.

2. The light-blocker apparatus of claim 1, wherein the attachment feature connects the support element to the eyecup by at least one of:
 irremovably integrating the support element with the eyecup; or
 removably attaching the support element to the eyecup.

3. The light-blocker apparatus of claim 2, wherein the attachment feature that removably attaches the support element to the eyecup comprises at least one of:
 a snap mechanism;
 a clip mechanism; or
 a friction-fit feature.

4. The light-blocker apparatus of claim 1, wherein the support element holds the molded shape based on the contour of the eyecup.

5. The light-blocker apparatus of claim 1, wherein the interface is molded to fit a contour shape around the eye area of the user's face and comprises at least one of:
 a semi-rigid material; or
 the pliant interface material.

6. The light-blocker apparatus of claim 1, wherein the pliant interface material flexibly adjusts to interface with the eye area of the user's face when the head-mounted display is worn by the user.

7. The light-blocker apparatus of claim 1, wherein the support element is further dimensioned to fit a contour of the prescription lens attachment dimensioned to be attached to the eyecup when the support element is attached to the eyecup.

8. The light-blocker apparatus of claim 1, wherein the attachment feature connects the support element to the prescription lens attachment.

9. The light-blocker apparatus of claim 1, wherein a prescription lens is dimensioned to be inserted into the support element such that the prescription lens distorts an image displayed by the eyecup when the support element is attached to the eyecup.

10. A head-mounted display system comprising:
a wearable frame securable to a user's head;
a right eyecup at an interface side of the wearable frame positioned to display an image to a right eye of a user;
a left eyecup at the interface side of the wearable frame positioned to display an additional image to a left eye of the user;
a right light-blocker apparatus attached to the right eyecup, via a first support element entirely comprising a rigid core material, to interface with a right eye area of a user's face via a first interface comprising a dual-material construction comprising the rigid core material and a pliant interface material that is molded to cover the rigid core material to reduce light entering the right eyecup when the wearable frame is secured to the user's head, wherein the right light-blocker apparatus is dimensioned to hold a first prescription lens attachment; and a left light-blocker apparatus attached to the left eyecup, via a second support element entirely comprising the rigid core material, to interface with a left eye area of the user's face via a second interface comprising the dual-material construction comprising the rigid core material and the pliant interface material that is molded to cover the rigid core material to reduce light entering the left eyecup when the wearable frame is secured to the user's head, wherein the left light-blocker apparatus is dimensioned to hold a second prescription lens attachment.

11. The head-mounted display system of claim 10, wherein the right eyecup is adjustably positioned to a position of the right eye on the user's head when the wearable frame is secured to the user's head.

12. The head-mounted display system of claim 10, wherein the left eyecup is adjustably positioned to a position of the left eye on the user's head when the wearable frame is secured to the user's head.

13. The head-mounted display system of claim 10, wherein the right eyecup and the left eyecup are adjustably positioned based on an interpupillary distance of the user by adjusting a distance between the right eyecup and the left eyecup.

14. The head-mounted display system of claim 10, wherein the right light-blocker apparatus is attached to the right eyecup to move in conjunction with a movement of the right eyecup.

15. The head-mounted display system of claim 10, wherein the left light-blocker apparatus is attached to the left eyecup to move in conjunction with a movement of the left eyecup.

16. The head-mounted display system of claim 10, further comprising at least one nose contact feature dimensioned to interface with a nose of the user to reduce light from outside of the head-mounted display, when worn by the user, from entering at least one of:
    the right eyecup; or
    the left eyecup.

17. A method of manufacturing comprising:
    dimensioning a support element to fit a contour of an eyecup of a head-mounted display and to hold a prescription lens attachment, wherein the support element entirely comprises a rigid core material that enables the support element to:
        inflexibly hold a molded shape to facilitate attachment to the eyecup; and
        integrate the prescription lens attachment;
    defining an attachment feature at a base of the support element to connect the support element to the eyecup such that, when the support element is attached to the eyecup, the support element moves in conjunction with an adjustment of the eyecup to fit a user; and
    extending an interface from the support element to interface with an eye area of a user's face to reduce light entering the eyecup from outside of the head-mounted display when worn by the user, wherein the interface comprises a dual-material construction comprising:
        the rigid core material of the support element that extends from the support element toward the eye area of the user's face; and
        a pliant interface material that is more flexible than the rigid core material of the support element and that is molded to cover the rigid core material to interface with the eye area of the user's face.

18. The method of manufacturing of claim 17, wherein defining the attachment feature to connect the support element to the eyecup comprises at least one of:
    defining the attachment feature to irremovably integrate the support element with the eyecup; or
    defining the attachment feature to removably attach the support element to the eyecup.

19. The method of manufacturing of claim 17, wherein extending the interface from the support element comprises at least one of:
    extending the rigid core material of the support element to interface with the eye area of the user's face; or
    covering the rigid core material with the pliant interface material that flexibly adjusts to interface with the eye area of the user's face when the head-mounted display is worn by the user.

20. The method of manufacturing of claim 17, further comprising dimensioning the support element to fit a contour of the prescription lens attachment dimensioned to be attached to the eyecup when the support element is attached to the eyecup.

* * * * *